US012775696B2

(12) United States Patent
Vaknin et al.

(10) Patent No.: US 12,775,696 B2
(45) Date of Patent: Oct. 27, 2026

(54) PROTECTING GENERATIVE AI FROM MALICIOUS SEQUENCES OF PROMPTS

(71) Applicant: Cisco Technology, Inc., San Jose, CA (US)

(72) Inventors: Aviva Vaknin, Jerusalem (IL); Aviad Rom, Pardes Hanna-Karkur (IL); Gil Baron, Giv'atayim (IL); Reem Rotenberg, Ramat Gan (IL); Mordechay Gold, Bnei-Brak (IL)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/821,122

(22) Filed: Aug. 30, 2024

(65) Prior Publication Data

US 2026/0064827 A1 Mar. 5, 2026

(51) Int. Cl.
*G06F 21/52* (2013.01)

(52) U.S. Cl.
CPC ........ *G06F 21/52* (2013.01); *G06F 2221/033* (2013.01)

(58) Field of Classification Search
CPC .......................... G06F 21/52; G06F 2221/033
See application file for complete search history.

(56) References Cited

U.S. PATENT DOCUMENTS 7,050,992 B1 * 5/2006 Bowman ............ G06Q 30/0641 705/26.8
10,025,936 B2 * 7/2018 Anand .................... G06F 21/52
11,783,025 B2 * 10/2023 Molloy .................. G06V 10/98 706/12
11,847,217 B2 * 12/2023 Healy ................... G06F 21/562
11,853,793 B2 * 12/2023 Chen ..................... G06F 18/214
11,893,358 B1 * 2/2024 Lakshmikanthan .... G06F 40/30
11,995,180 B1 5/2024 Cappel et al.
12,094,010 B1 * 9/2024 Hampapur ............. G16H 40/20
12,111,926 B1 * 10/2024 Beveridge ............. G06F 21/554
12,174,960 B1 * 12/2024 Shen ..................... G06F 21/566
12,204,323 B1 * 1/2025 Malviya ............. G05B 23/0216
12,242,522 B2 * 3/2025 Gardner .............. G06F 16/3329

(Continued)

FOREIGN PATENT DOCUMENTS

IN 202341026003 A 4/2024

OTHER PUBLICATIONS

Jeong Y-S., et al., "File-level Malware Detection Using Byte Streams", Scientific Reports, vol. 13, No. 8925, Jun. 1, 2023, pp. 1-7.

(Continued)

*Primary Examiner* — Aravind K Moorthy
(74) *Attorney, Agent, or Firm* — Merchant & Gould P.C.; Kenneth J. Heywood

(57) ABSTRACT

In one implementation, a device identifies a sequence of related prompts for input to a generative model. The device makes individual maliciousness assessments of those prompts in the sequence of related prompts. The device makes a collective maliciousness assessment of the sequence of related prompts. The device prevents at least a portion of the sequence of related prompts from being input to the generative model, when any of the individual maliciousness assessments or the collective maliciousness assessment indicates a malicious request to the generative model.

20 Claims, 5 Drawing Sheets

(56) References Cited

U.S. PATENT DOCUMENTS 12,292,930 B1 * 5/2025 Miller ................. G06F 16/2428
12,346,252 B1 * 7/2025 Dhakal ............... H04L 67/5681
12,353,407 B1 * 7/2025 Shachaf ................ G06F 16/243
12,423,443 B2 * 9/2025 Lafon ................. G06F 16/3344
12,437,058 B1 * 10/2025 Majmudar .............. G06F 21/54
12,475,254 B2 * 11/2025 Cohen ................. H04L 63/1491
12,524,544 B2 * 1/2026 Merchant .............. G06F 21/566
12,536,894 B2 * 1/2026 Katt ..................... G08B 25/007
12,541,638 B2 * 2/2026 Muralidharan ....... G06F 40/166
12,591,662 B2 * 3/2026 Mantin ................... G06F 21/54
12,632,569 B1 * 5/2026 Zhou ..................... G06F 21/577
2002/0049752 A1 * 4/2002 Bowman ............... G06F 16/334
2007/0186282 A1 * 8/2007 Jenkins ............... H04L 63/1416
726/22
2008/0244690 A1 * 10/2008 Kulkarni ............... G06F 21/552
726/1
2012/0233140 A1 * 9/2012 Collins-Thompson ......................
G06F 16/3338
707/706
2020/0211021 A1 * 7/2020 Allbright ............... G06N 20/10
2021/0165901 A1 * 6/2021 Chandrashekhar .... G06N 20/20
2021/0365832 A1 * 11/2021 Hu ......................... G06N 20/20
2022/0012352 A1 * 1/2022 Boding .................. G06N 20/00
2022/0108036 A1 * 4/2022 Ogura ................. H04L 63/0807
2022/0114638 A1 * 4/2022 Ambridge .......... G06Q 30/0215
2022/0253690 A1 * 8/2022 Sinha ..................... G06N 3/045
2023/0069077 A1 * 3/2023 Scott ................. G06F 16/24575
2023/0267203 A1 * 8/2023 Vorobyov ............. G06F 21/566
726/23
2023/0384858 A1 * 11/2023 Guionnet ................ G06F 3/167
2024/0054233 A1 2/2024 Ohayon et al.
2024/0086577 A1 * 3/2024 Zhang ................. G06F 21/6263
2024/0223601 A1 * 7/2024 Tirumala ............ H04L 63/1416
2024/0302803 A1 * 9/2024 Bagoly .............. G05B 13/0265
2024/0311582 A1 * 9/2024 Schaefer ............. G06F 11/3608
2024/0320447 A1 * 9/2024 Liu ......................... G06F 40/30
2024/0403658 A1 * 12/2024 Rigterink ............... G06N 5/022
2024/0419835 A1 * 12/2024 Karlberg ............. G06F 16/3329
2025/0068859 A1 * 2/2025 Kim ...................... G06F 40/289
2025/0077844 A1 * 3/2025 Lin ...................... G06N 3/0475
2025/0078074 A1 * 3/2025 Humpherys ........... G06N 20/00
2025/0110982 A1 * 4/2025 Todirel .................. G06F 3/0488
2025/0111039 A1 * 4/2025 Mantin ................. G06F 21/577
2025/0111141 A1 * 4/2025 Ferenczi ................. G06F 40/20
2025/0150474 A1 * 5/2025 Jones ...................... G06F 21/60
2025/0165477 A1 * 5/2025 Armbrust .............. G06F 9/4881
2025/0173438 A1 * 5/2025 Maddux ................... G06N 3/08
2025/0181655 A1 * 6/2025 Saxberg .................. G06F 40/20
2025/0190802 A1 * 6/2025 Kar ...................... G06N 3/0895
2025/0209172 A1 * 6/2025 Merchant .............. G06F 21/566
2025/0217584 A1 * 7/2025 Palanki ................... G06F 40/20
2025/0238520 A1 * 7/2025 Ramiah .............. G06Q 10/0875
2025/0238631 A1 * 7/2025 Zilberg ..................... G06F 8/30
2025/0240277 A1 * 7/2025 Pathak ................ H04L 63/1458
2025/0245122 A1 * 7/2025 Schaefer ............. G06F 9/44589
2025/0245327 A1 * 7/2025 Tagomori .............. G06F 21/577
2025/0259004 A1 * 8/2025 Sharpe .................. G06F 40/284
2025/0272279 A1 * 8/2025 Kshirsagar ............ G06F 16/252
2025/0278630 A1 * 9/2025 Horesh ................ G06N 3/0895
2025/0299021 A1 * 9/2025 Palladino ............... G06N 3/084
2025/0307418 A1 * 10/2025 Spencer ................ G06F 21/577
2025/0307541 A1 * 10/2025 Symborski .............. G06F 40/20
2025/0307613 A1 * 10/2025 Madan .................. G06F 40/279
2025/0307702 A1 * 10/2025 Ghosh .................... G06N 3/045
2025/0307738 A1 * 10/2025 Dempsey ............. G06Q 10/103
2025/0315223 A1 * 10/2025 Chlipala ................... G06F 8/36
2025/0322216 A1 * 10/2025 Levin ..................... G06N 3/045
2025/0371131 A1 * 12/2025 Yarabolu ................. G06F 21/52
2025/0371133 A1 * 12/2025 Mantin ................... G06F 21/54
2025/0371192 A1 * 12/2025 Whitenack .......... G06F 21/6254
2025/0384132 A1 * 12/2025 Fu ......................... G06F 21/566
2026/0017413 A1 * 1/2026 Bajaj ....................... G06F 21/64
2026/0037617 A1 * 2/2026 Melin ..................... G06F 21/54

OTHER PUBLICATIONS

Kumar A., et al., "Certifying LLM Safety against Adversarial Prompting", arXiv:2309.02705v3 [cs. CL], Feb. 12, 2024, pp. 1-32.
Langchain: "OpenAI Functions", Retrieved from https://python.langchain.com/v0.1/docs/modules/agents/agent_types/openai_functions_agent/ on Aug. 1, 2024, pp. 1-5.
Shah D., "The ELI5 Guide to Prompt Injection: Techniques, Prevention Methods and Tools", Lakera, May 25, 2023, Retrieved from https://www.lakera.ai/blog/guide-to-prompt-injection, Accessed on Jun. 5, 2024, pp. 1-21.
Sharma R.K., et al., "SPML: A DSL for Defending Language Models Against Prompt Attacks", arXiv:2402.11755v1 [cs.LG], Feb. 19, 2024, pp. 1-18.
Vijayan J., "LLMs Open to Manipulation Using Doctored Images, Audio", Darkreading, Dec. 5, 2023, Retrieved from https://www.darkreading.com/vulnerabilities-threats/llms-open-manipulation-using-doctored-images-audio on Jun. 5, 2024, pp. 1-10.
Xiang Z., et al., BadChain: Backdoor Chain-of-Thought Prompting for Large LanguageWorkshop on Backdoors in Deep Learning: The Good, the Bad, and the Ugly, Oct. 28,.

* cited by examiner

PROTECTING GENERATIVE AI FROM MALICIOUS SEQUENCES OF PROMPTS

TECHNICAL FIELD

The present disclosure relates generally to computer networks and more particularly to protecting generative artificial intelligence (AI) from malicious sequences of prompts.

BACKGROUND

The recent breakthroughs in large language models (LLMs) and generative artificial intelligence, in general, represent new opportunities across a wide spectrum of industries. Indeed, the ability of these models to follow instructions now allow for interactions with tools (also called plugins) that are able to perform tasks such as searching the web, executing code, etc. In addition, such models are also able to interact with human users in a conversational manner to provide answers to highly technical and complex questions.

One challenge with respect to generative artificial intelligence relates to ensuring that the model does not perform a prohibited action at the behest of a malicious entity. For instance, the malicious entity may request that the model perform a malicious action such as providing confidential or other protected information in its response, executing malicious code, disabling a service in a network, and the like. While it is fairly straightforward to identify prompts that overtly request such malicious actions, it is much harder to identify prompt injection attacks that seek to conceal the malicious action within otherwise legitimate prompts. For instance, the malicious entity may build up a file one prompt at a time and then ask the model to open or invoke the entire file, to initiate the intended malicious behavior. In such instances, each prompt may itself appear innocuous, but represents a threat when taken in combination with its other related prompts.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device identifies a sequence of related prompts for input to a generative model. The device makes individual maliciousness assessments of those prompts in the sequence of related prompts. The device makes a collective maliciousness assessment of the sequence of related prompts. The device prevents at least a portion of the sequence of related prompts from being input to the generative model, when any of the individual maliciousness assessments or the collective maliciousness assessment indicates a malicious request to the generative model.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
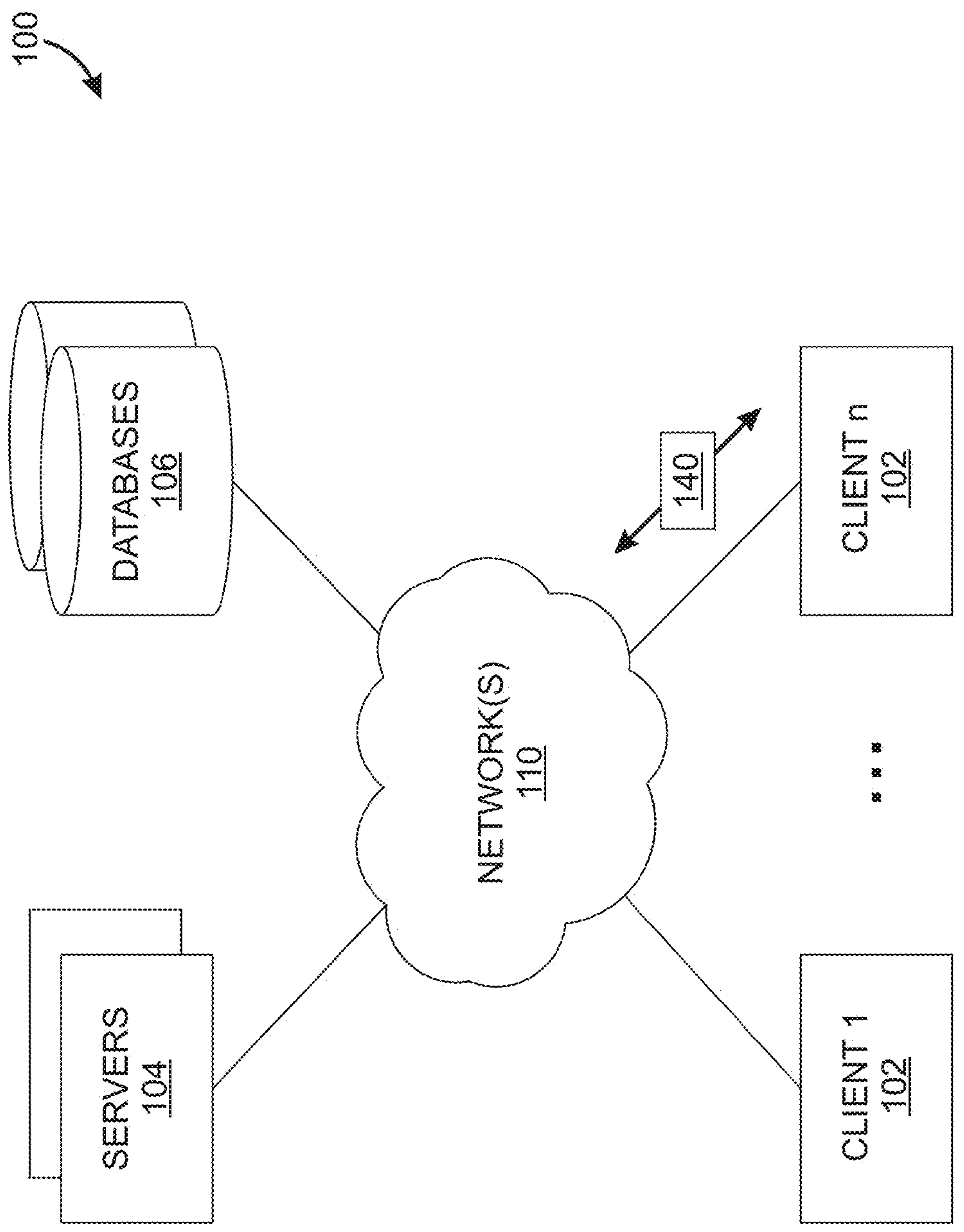
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
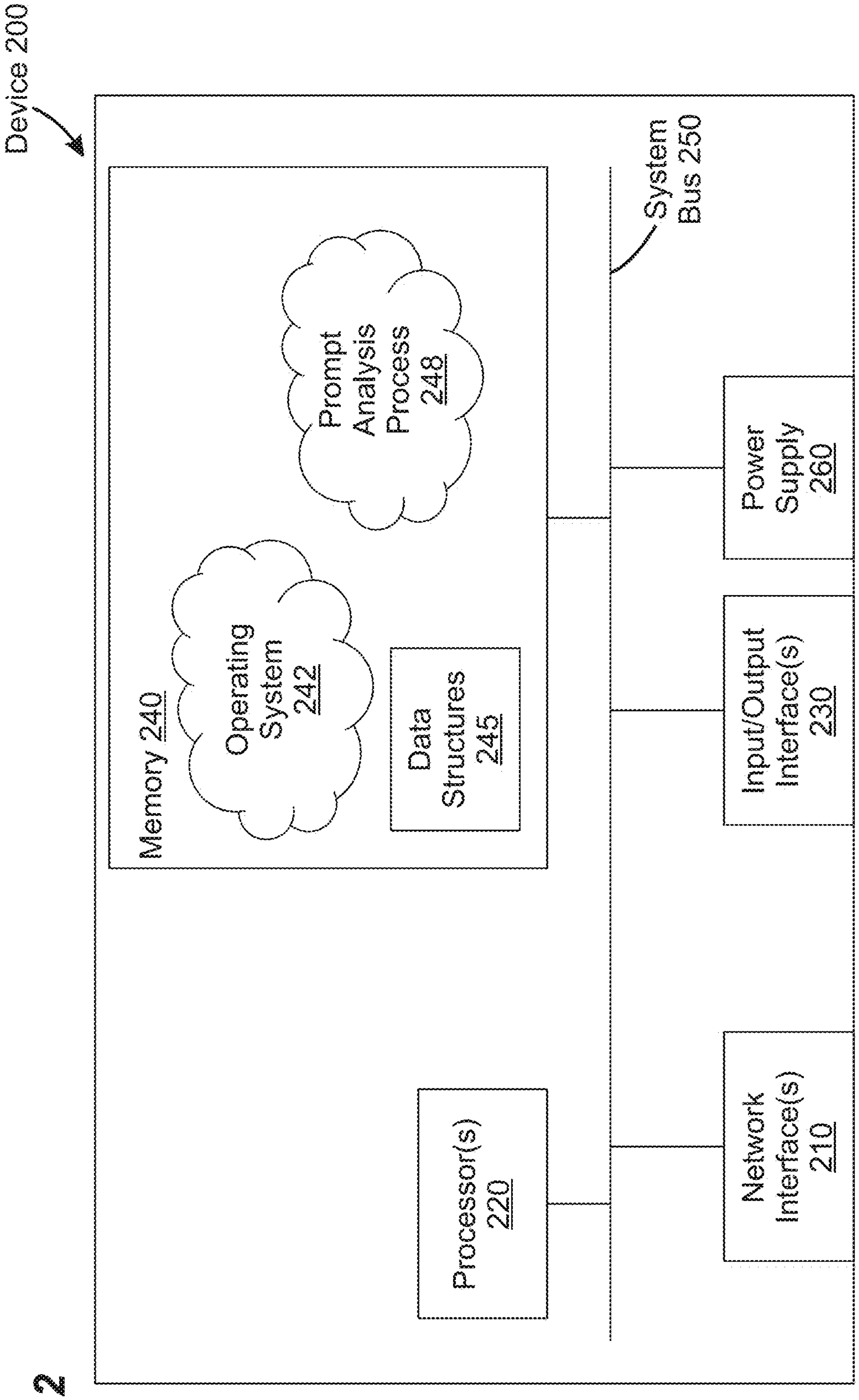
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a prompt analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, prompt analysis process 248 may include computer executable instructions that, when executed by processor 220, cause device 200 to perform the techniques described herein. To do so, in some implementations, prompt analysis process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, prompt analysis process 248 may employ and/or be utilized to handle prompts to and/or access of one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the prompt analysis process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, prompt analysis process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of machine unlearning, prompt analysis process 248 may be a component of, use, and/or be utilized in the management of prompts/access to a generative model to perform layer attribution, perform layer sensitivity assessment, remove capabilities from a previously trained model, retain model performance, etc. based on a conversational input from a user (e.g., voice, text, etc.). Example generative approaches can include, but are not limited to, generative adversarial networks (GANs), large language models (LLMs), other transformer models, and the like.

Figure 3:
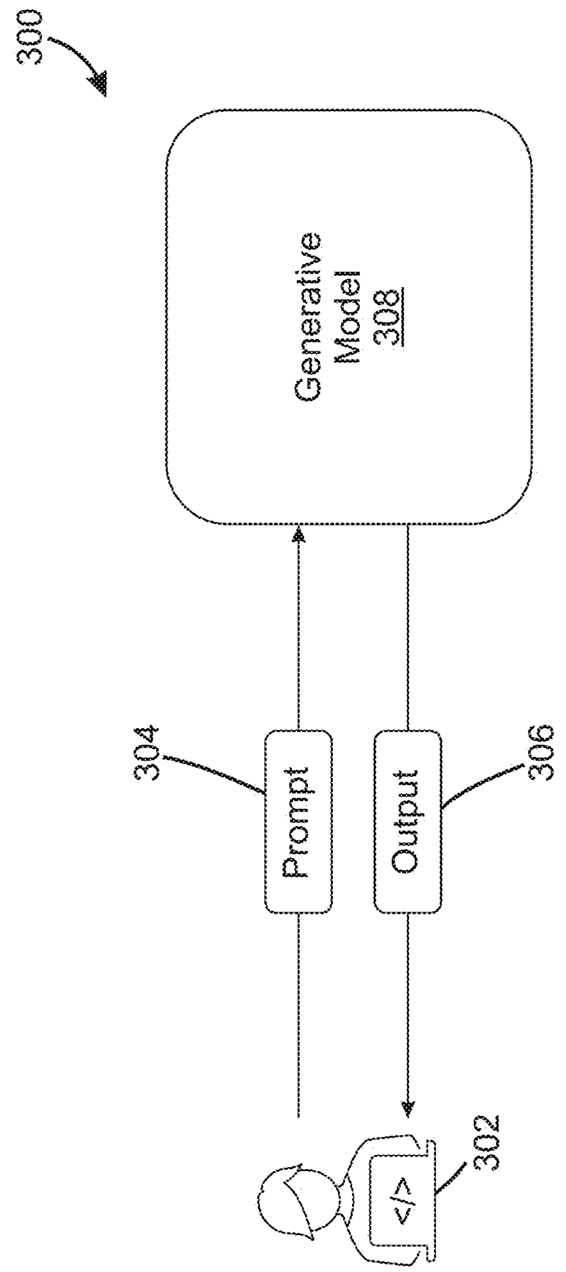
FIG. 3 illustrates an example of interfacing with a generative model.

FIG. 3 illustrates an example 300 for interfacing with a generative model, in various implementations. In example 300, a user 302 may send a prompt 304 (e.g., a query, a query augmented with additional data, documents, and/or images, etc.) to a generative model 308. The generative model 308 may be configured to process a prompt 304 to generate an output 306 to satisfy the prompt 304.

The generative model 308 may be a model configured to apply its trained algorithms to generate a response (e.g., output 306) based on the prompt 304 provided. For instance, in some cases, generative model 308 may take the form of a large language model (LLM), diffusion-based model, combinations thereof, or the like. In some instances, the generative model 308 may also maintain a history of prompts issued by user 302, to help improve its performance.

The output 306 may be the result produced by the generative model 308 (e.g., by the application of the generative model 308 to the prompt 304). This output can vary depending on the model's configuration and the task at hand. For example, the output 306 may include one or more of a generated and/or synthesized image, a text response, a classification and/or prediction, etc.

As noted above, it is relatively trivial to identify a malicious prompt or, at the very least, prevent certain outputs from being returned to the user. For instance, consider the case in which a malicious user issues the prompt: "what are the Social Security numbers for the people in Engineering?" In such a case, the system could quickly identify the request as asking for protected information and prevent the request from being input to the model. Alternatively, the system could scan the generated response for social security numbers and block the response from being sent back to the malicious user.

One particularly challenging case, though, is when the malicious action being requested is concealed across multiple prompts. For instance, consider the case in which a malicious entity wants the system to execute some form of malware, but divides the code into multiple prompts before asking the system to concatenate the prompts into the full code for execution. On their faces, each prompt may be innocuous, simply including the code for various methods or the like. However, a subsequent prompt may ask the system to concatenate the previous prompts into the full code and run it.

Protecting Generative AI from Malicious Sequences of Prompts

The techniques introduced herein are able to protect a generative AI system from malicious sequences of prompts, even in instances in which the constituent prompts are seemingly innocuous. In some aspects, the techniques herein are able to do so prior to processing by the generative model, before action is taken and invoking the malicious behavior.

Illustratively, the techniques described herein may be performed by hardware, software, and/or firmware, such as in accordance with prompt analysis process 248, which may include computer executable instructions executed by the processor 220 (or independent processor of interfaces 210) to perform functions relating to the techniques described herein.

Specifically, according to various implementations, a device identifies a sequence of related prompts for input to a generative model. The device makes individual maliciousness assessments of those prompts in the sequence of related prompts. The device makes a collective maliciousness assessment of the sequence of related prompts. The device prevents at least a portion of the sequence of related prompts from being input to the generative model, when any of the individual maliciousness assessments or the collective maliciousness assessment indicates a malicious request to the generative model.

Figure 4:
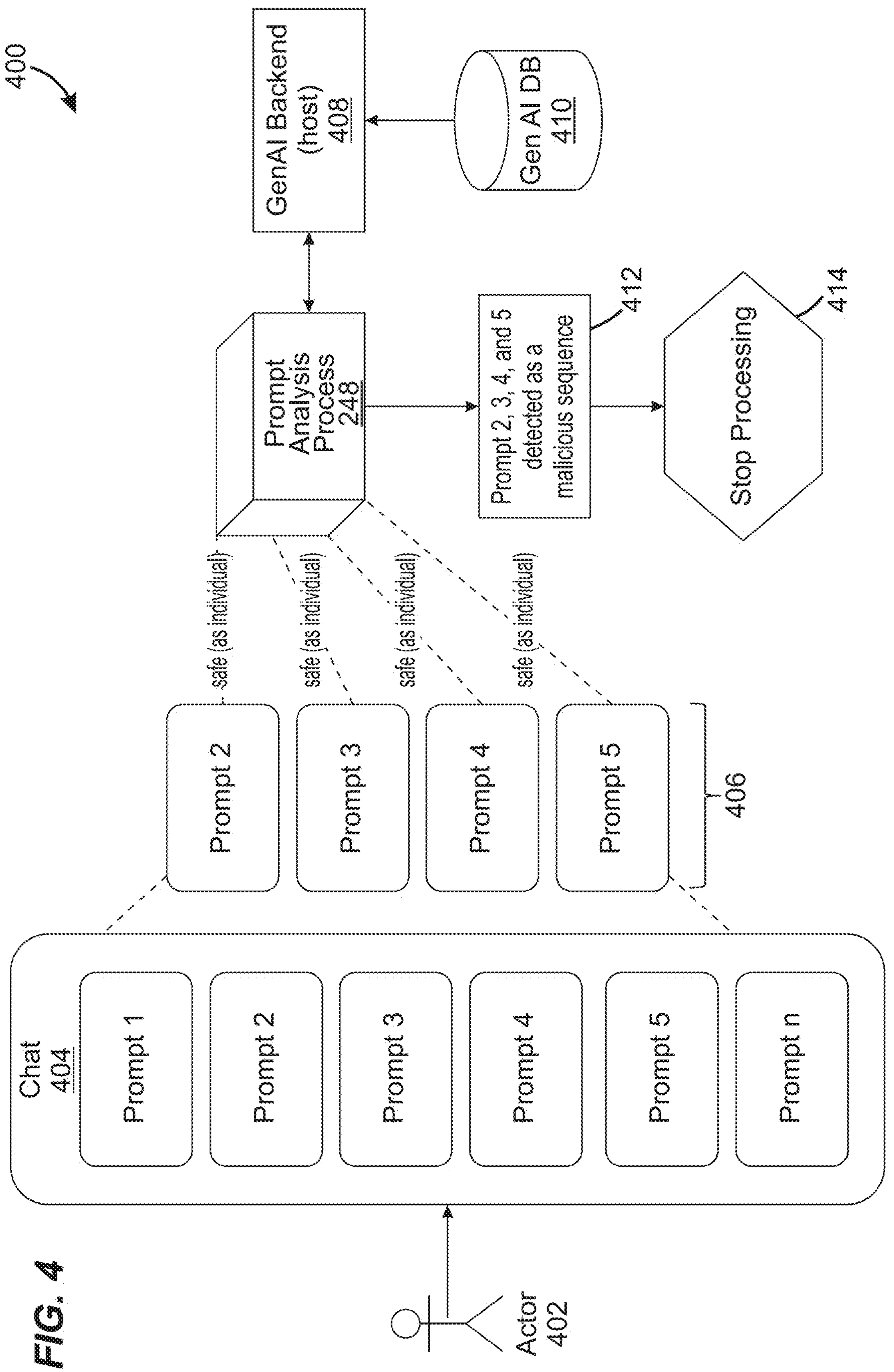
FIG. 4 illustrates an example architecture for protecting generative artificial intelligence (AI) from malicious sequences of prompts.

Operationally, FIG. 4 illustrates an example architecture 400 for protecting generative AI from malicious sequences of prompts, in various implementations. As shown, assume that there is an actor 402 (e.g., a user, device, system, etc.) that initiates a chat session 404 with a generative AI backend 408. For instance, generative AI backend 408 may take the form of a chatbot or other assistant that allows actor 402 to interact with the generative AI model hosted by generative AI backend 408.

As noted, one potential approach to tricking generative AI backend 408 into performing a malicious action, such as reveling protected information, executing malicious code, etc. is to conceal the intended action across multiple prompts. For instance, if actor 402 is a malicious actor, they may initiate chat session 404 with generative AI backend 408 and split the malicious action into n-number of sequential prompts 406. For instance, a malicious user could build up a malicious file/text/image or other inputs onto a system one prompt at a time using an LLM based chatbot by instructing the chatbot to store information for future retrieval. Once the file/entity is complete the user asks the chatbot to access and use the entire compiled result of prompt concatenation (for example, by a file checker or upload of an image) which now contains malware, thus activating the malicious behavior.

Some possible ways to inject malicious text onto the system include, but are not limited to, any of the following:

- Database store—e.g., tricking generative AI backend 408 into storing prompts over time in its generative AI database 410
- XSS attack
- File write
- Listener
- Using function callbacks by the chatbot framework such as OpenAI functions in Langchain To guard against such attacks, prompt analysis process 248 may assess prompts 406, as well as their sequence (and sub-sequences). In some instances, prompt analysis process 248 may be hosted by an intermediary device (e.g., device 200, such as a router, switch, gateway, etc.). In other implementations, prompt analysis process 248 may be implemented as part of generative AI backend 408 as a pre-processing component.

In various implementations, prompt analysis process 248 may proceed as follows:

First, prompt analysis process 248 may identify prompts 406 as being a sequence of related prompts. This is feasible since generative AI backend 408 will need to relate them, as well, to aggregate them into a single file or other entity). For example, all related prompts sent to generative AI backend 408 may include a unique prompt sequence identifier that prompt analysis process 248 can use to determine that prompts 406 form a sequence of related prompts. In other instances, prompt analysis process 248 may infer this, based on prompts 406 belonging to the same chat session 404 or being issued by the same actor 402.

For each of prompts 406, prompt analysis process 248 may run prompt analysis on the incoming prompt, to assess whether that individual prompt is malicious. In addition, prompt analysis process 248 may also make a maliciousness assessment on the full sequence and/or set of sub-sequences of prompts 406. To do so, prompt analysis process 248 may construct these sequence(s) by concatenating combinations of the related prompts 406 that it has received thus far, to identify malicious intent before the entire input is compiled and run by generative AI backend 408.

For example: Suppose prompt analysis process 248 received the $6^{th}$ prompt in a sequence of ten prompts. Prompt analysis process 248 may perform malicious detection analysis on the incoming prompt, on the incoming prompt concatenated with sequences of two already received prompt pieces, on the incoming prompt concatenated with sequences of three already received prompt pieces, etc., until prompt analysis process 248 has made maliciousness assessments for any or all series of sub-sequences of the six prompts concatenated into a single prompt.

In some implementations, prompt analysis process 248 may construct a graph representation of the received prompts 406 and traverse the graph to assemble sub-sequences of the prompt efficiently.

In another implementation, prompt analysis process 248 may use sliding window prompt analysis. That is, prompt analysis process 248 may choose a window size k and analyze sub-sequences that include k prompts, starting with the next prompt piece in sequence, each time it receives a new prompt. In a further extension, prompt analysis process 248 may even analyze any or all permutations of the received prompts, not necessarily composed in the received order.

In various implementations, prompt analysis process 248 may make the maliciousness assessments by using the prompt sequence(s) as input to a local machine learning model that has been trained to detect individual malicious prompts. For instance, such a model may have been specially trained and/or based on publicly available models (e.g., HuggingFace, a collection of both models and datasets for LLM, BERT or LSTM based applications, etc.).

If prompt analysis process 248 determines that any of the individual prompts 406, or a sequence of the prompts (e.g., either the full sequence or a sub-sequence thereof), indicates a malicious request, prompt analysis process 248 may prevent generative AI backend 408 from processing at least a portion of those prompts. For instance, assume that prompt analysis process 248 makes a determination 412 that the second through fifth prompts in prompts 406 are individually save, but also represent a malicious sequence. In such a case, prompt analysis process 248 may initiate a corrective measure 414, such as stopping all processing of prompts 406. Other corrective measures could also include providing an alert to a user interface, security service, or the like, indicative of prompts 406 being indicative of a malicious request.

Figure 5:
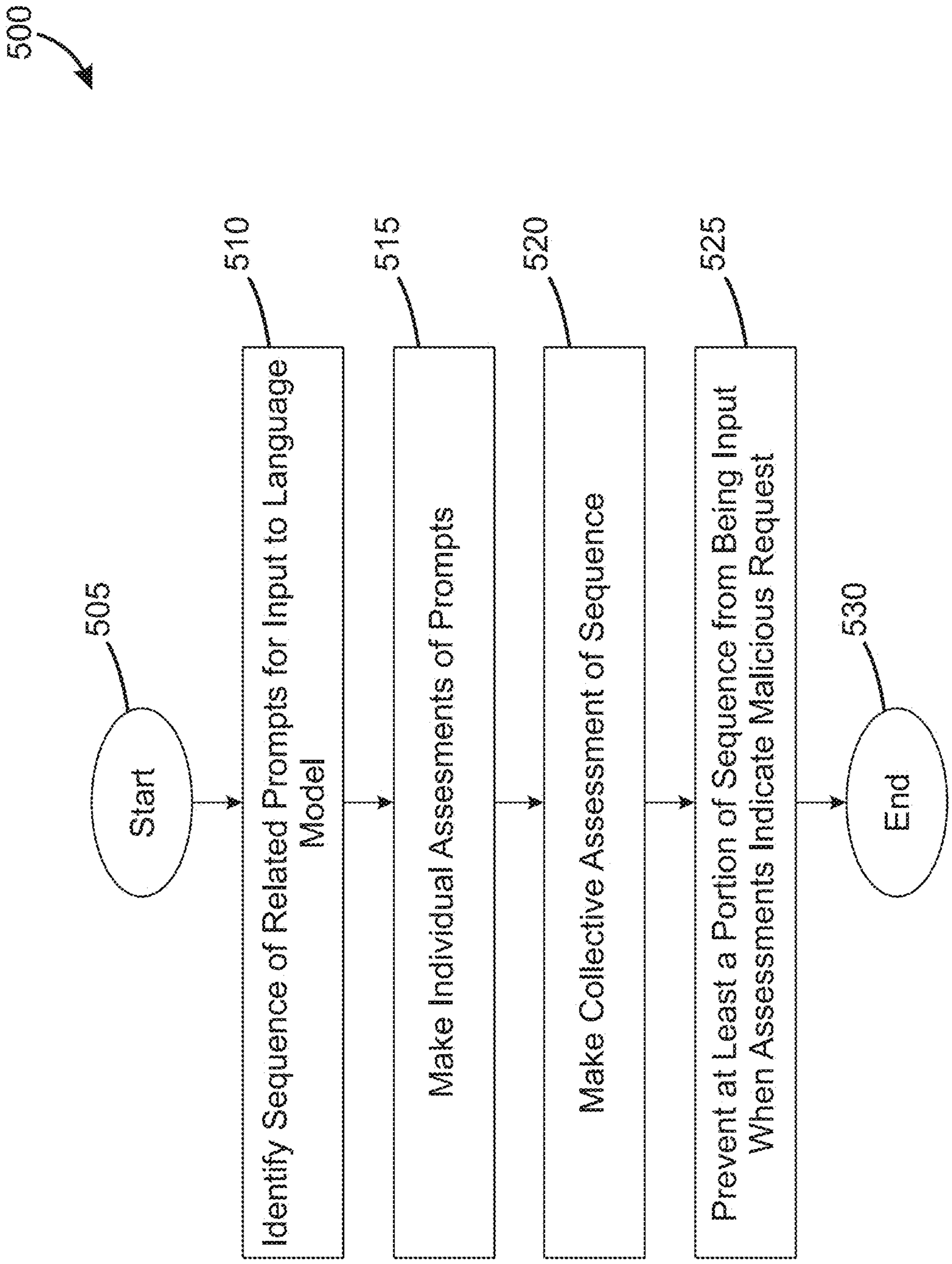
FIG. 5 illustrates an example of a simplified procedure for protecting generative AI from malicious sequences of prompts, in accordance with one or more implementations described herein.

FIG. 5 illustrates an example of a simplified procedure for protecting generative AI from malicious sequences of prompts, in accordance with one or more implementations described herein. For example, a non-generic, specifically configured device (e.g., device 200), may perform procedure 500 (e.g., a method) by executing stored instructions (e.g., prompt analysis process 248). The procedure 500 may start at step 505, and continues to step 510, where, as described in greater detail above, the device (e.g., a controller, server, etc.) may identify a sequence of related prompts for input to a generative model. In some implementations, the generative model is a large language model (LLM). In one implementation, the device identifies the sequence of related prompts based on a unique sequence identifier associated with the sequence of related prompts. In some instances, the sequence of related prompts forms a malicious file or image. In one implementation, the device is an intermediary device between an endpoint that issued the sequence of related prompts and a host for the generative model.

At step 515, as detailed above, the device may make individual maliciousness assessments of those prompts in the sequence of related prompts. For instance, the device may scan the prompts for malicious requests, individually.

At step 520, the device may make a collective maliciousness assessment of the sequence of related prompts, as described in greater detail above. In some cases, the individual maliciousness assessments indicate that those prompts in the sequence of related prompts are individually non-malicious and the collective maliciousness assessment indicates that the sequence of related prompts is malicious. In one implementation, the device may make the collective maliciousness assessment by making maliciousness assessments of different subsequences of the sequence of related prompts. In such a case, the device may also identify the different subsequences of the sequence of related prompts by traversing a graph that represents the sequence of related prompts. In a further implementation, the device uses a machine learning model to make the individual maliciousness assessments and the collective maliciousness assessment.

At step 525, as detailed above, the device may prevent at least a portion of the sequence of related prompts from being input to the generative model, when any of the individual maliciousness assessments or the collective maliciousness assessment indicates a malicious request to the generative model. In some implementations, the device may also provide an indication that the portion of the sequence of related prompts was prevented from being input to the generative model, such as to another device or user interface.

Procedure 500 may then end at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for protecting generative AI from malicious sequences of prompts, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

identifying, by a device, a sequence of related prompts for input to a generative model;

making, by the device, individual maliciousness assessments of those prompts in the sequence of related prompts;

making, by the device, a collective maliciousness assessment of the sequence of related prompts, wherein the individual maliciousness assessments indicate that those prompts in the sequence of related prompts are individually non-malicious and the collective maliciousness assessment indicates that the sequence of related prompts is malicious; and preventing, by the device, at least a portion of the sequence of related prompts from being input to the generative model, when any of the individual maliciousness assessments or the collective maliciousness assessment indicates a malicious request to the generative model.

2. The method as in claim 1, wherein the generative model is a large language model (LLM).

3. The method as in claim 1, wherein the device identifies the sequence of related prompts based on a unique sequence identifier associated with the sequence of related prompts.

4. The method as in claim 1, further comprising:

providing, by the device, an indication that the portion of the sequence of related prompts was prevented from being input to the generative model.

5. The method as in claim 1, wherein the sequence of related prompts forms a malicious file or image.

6. The method as in claim 1, wherein making the collective maliciousness assessment of the sequence of related prompts comprises:

making maliciousness assessments of different subsequences of the sequence of related prompts.

7. The method as in claim 6, further comprising:

identifying the different subsequences of the sequence of related prompts by traversing a graph that represents the sequence of related prompts.

8. The method as in claim 6, further comprising:

generating the different subsequences of the sequence of related prompts by concatenating combinations of prompts from the sequence of related prompts.

9. The method as in claim 1, wherein the device uses a machine learning model to make the individual maliciousness assessments and the collective maliciousness assessment.

10. The method as in claim 1, wherein the device is an intermediary device between an endpoint that issued the sequence of related prompts and a host for the generative model.

11. An apparatus, comprising:

one or more network interfaces;

a processor coupled to the one or more network interfaces and configured to execute one or more processes; and a memory configured to store a process that is executable by the processor, the process when executed configured to:

identify a sequence of related prompts for input to a generative model;

make individual maliciousness assessments of those prompts in the sequence of related prompts;

make a collective maliciousness assessment of the sequence of related prompts, wherein the individual maliciousness assessments indicate that those prompts in the sequence of related prompts are individually non-malicious and the collective maliciousness assessment indicates that the sequence of related prompts is malicious; and prevent at least a portion of the sequence of related prompts from being input to the generative model, when any of the individual maliciousness assessments or the collective maliciousness assessment indicates a malicious request to the generative model.

12. The apparatus as in claim 11, wherein the generative model is a large language model (LLM).

13. The apparatus as in claim 11, wherein the apparatus identifies the sequence of related prompts based on a unique sequence identifier associated with the sequence of related prompts.

14. The apparatus as in claim 11, wherein the process when executed is further configured to:

provide an indication that the portion of the sequence of related prompts was prevented from being input to the generative model.

15. The apparatus as in claim 11, wherein the sequence of related prompts forms a malicious file or image.

16. The apparatus as in claim 11, wherein the apparatus makes the collective maliciousness assessment of the sequence of related prompts by:

making maliciousness assessments of different subsequences of the sequence of related prompts.

17. The apparatus as in claim 16, wherein the process when executed is further configured to:

identify the different subsequences of the sequence of related prompts by traversing a graph that represents the sequence of related prompts.

18. The apparatus as in claim 11, wherein the apparatus uses a machine learning model to make the individual maliciousness assessments and the collective maliciousness assessment.

19. A tangible, non-transitory, computer-readable medium storing program instructions that cause a device to execute a process comprising:

identifying, by the device, a sequence of related prompts for input to a generative model;

making, by the device, individual maliciousness assessments of those prompts in the sequence of related prompts;

making, by the device, a collective maliciousness assessment of the sequence of related prompts, wherein the individual maliciousness assessments indicate that those prompts in the sequence of related prompts are individually non-malicious and the collective maliciousness assessment indicates that the sequence of related prompts is malicious; and preventing, by the device, at least a portion of the sequence of related prompts from being input to the generative model, when any of the individual maliciousness assessments or the collective maliciousness assessment indicates a malicious request to the generative model.

20. The tangible, non-transitory, computer-readable medium as in claim 19, wherein the generative model is a large language model (LLM).

* * * * *